United States Patent [19]
Deveney

[11] Patent Number: 5,805,262
[45] Date of Patent: Sep. 8, 1998

[54] RING FOR SECURING CORDS AND CHAINS TO SPECTACLE SIDE PIECES

[76] Inventor: Jean-Paul Deveney, 3 Route. de Boesse, Echilleuse 45300, France

[21] Appl. No.: 637,741

[22] Filed: Aug. 19, 1996

[30] Foreign Application Priority Data

Sep. 1, 1994 [FR] France .................. 1994/10534

[51] Int. Cl.⁶ ....................................... G02C 3/00
[52] U.S. Cl. ............................. 351/157; 351/157
[58] Field of Search ................... 351/156, 157, 351/41

[56] References Cited

U.S. PATENT DOCUMENTS 5,092,668  3/1992  Welch et al. ............... 351/156

FOREIGN PATENT DOCUMENTS

WO 9318430  9/1993  WIPO .

Primary Examiner—Hung X. Dang
Attorney, Agent, or Firm—Weiser and Associates P. C.

[57] ABSTRACT

A fastener, adapted to attach a cord or a chain to a sidepiece of a pair of eyeglasses, has a cylindrical tightening ring and an elastic loop having a cross section with a flat side and a curved side. The inner diameter of the tightening ring is smaller than the length of the flat side of the cross section of the elastic loop. When the elastic loop is passed through the tightening ring, the flat sides of two cross sections of the elastic loop face each other and the curved sides of the two cross sections face the inner surface of the tightening ring to secure the tightening ring to the elastic loop. When the fastener is attached to the sidepiece, the flat side of the cross section of the elastic loop faces the sidepiece to secure the elastic loop to the sidepiece.

6 Claims, 1 Drawing Sheet

RING FOR SECURING CORDS AND CHAINS TO SPECTACLE SIDE PIECES

BACKGROUND OF THE INVENTION

1. Field of the Invention

The present invention relates to loop fasteners for attaching cords and chains to the temple bars of eyeglasses.

2. Description of the Related Art

The currently known loop fasteners for attaching cords and chains to the temple bars of eyeglasses are comprised either of a flat PVC loop, generally produced by perpendicular, parallel cuts from a flexible PVC tube, or of a round synthetic rubber (neoprene or nitrile) loop, produced by molding or injection and designed to function as joints in the hydraulic industry. These loop fasteners have the two shortcomings of providing only a low level of adhesion with the eyeglass temple bars and of only partially filling the tightening ring, thus not assuring the clamping of the ring and allowing the ring to slip such that the loop fastener loosens and allows the temple bar to escape.

Although there is also a system which employs two round loops rather than a single loop, the surface areas of the loops in contact with the temple bars and the interior of the ring are clearly smaller than those of the invention in accordance with this patent.

By using two joints of round cross section, passing through the interior of a single tightening ring, the adhesion to the temple bar after the tightening of the ring still remains limited to the slightly flattened parts on the temple bar, and the surface areas of contact, and thus of adhesion, are smaller by more than half than those of the new invention, in terms of adhesion to the temple bar where any round loop fastener is inferior to the object of the invention, and any flat loop fastener readily slips because of the play caused by the unfilled volume of the ring.

SUMMARY OF THE INVENTION

The new invention, which eliminates all of these shortcomings, is comprised of a loop fastener made of natural or synthetic rubber, preferably neoprene, specifically designed for the attachment of cords to eyeglasses.

DETAILED DESCRIPTION

Figure 1:
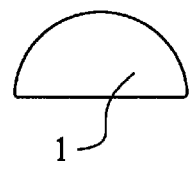
FIGS. 1 and 2 show cross sections of a loop fastener, according to two different embodiments of the present invention.
Figure 2:
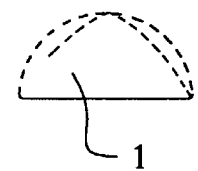
Figure 3:
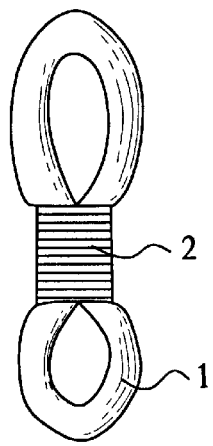
FIG. 3 shows a loop fastener, according to one embodiment of the present invention.
Figure 4:
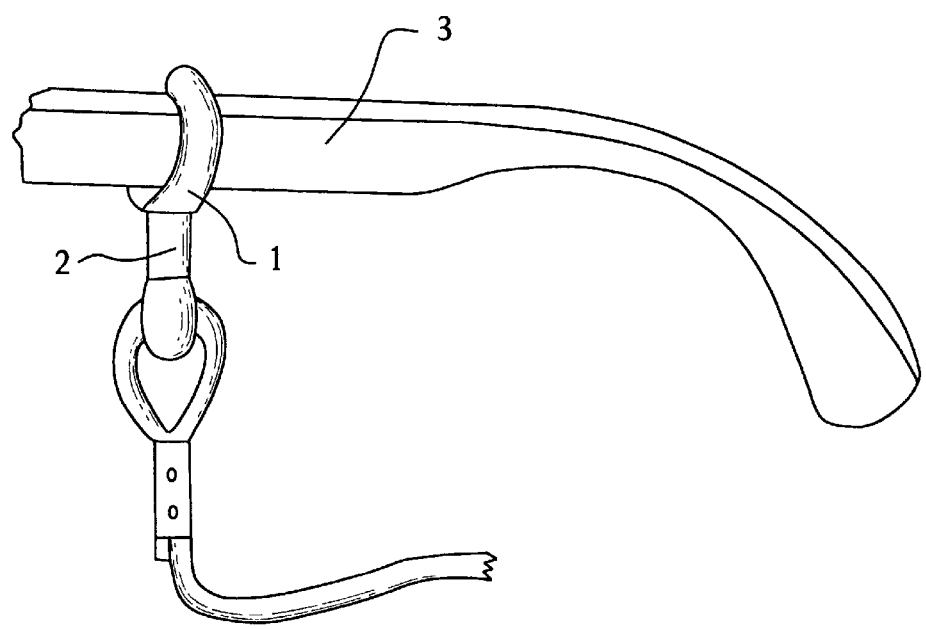
FIG. 4 shows the loop fastener of FIG. 3 configured to one sidepiece of a pair of eyeglasses and to a cord.

The cross section 1 of this loop fastener is semi-circular, the base of its section, which has the diameter of the semicircle that it forms, is flat and comes into full contact with the temple bar 3, and the two parts of the loop by being connected together inside the ring 2 form a circle that fills the ring, and thereby eliminates play that could allow the loop to slip in the ring.

In the new invention the two parts of the loop by being connected together when passed inside the ring present a cross section whose diameter is larger than that of the ring, which creates the requirement of having to stretch the loops in order for them to pass through the ring.

The stretching of the loop releases the ring and inserts the two parts of the loop in it, forming on them via compression a flange at the edge of each end of the ring, with these flanges preventing any slipping of the ring thereby assuring the constant and maximum clamping of the loop on the temple bars of the eyeglasses.

The exterior form of the loop can also include grooves, or any other type of rough finish to enhance the locking of the tightening ring.

In a preferred, nonlimitative implementation, the arc of the loop is slightly modified so as to provide a more refined appearance on the temple bars of the eyeglasses, with the arc 1 being slightly conical. This reduction in material is largely compensated for by the compressive effect, and thus does not affect whatsoever the filling of the ring.

I claim:

1. A fastener, adapted to attach a cord or a chain to a sidepiece of a pair of eyeglasses, comprising a cylindrical tightening ring and an elastic loop having a cross section with a flat side and a curved side, wherein the inner diameter of the tightening ring is smaller than the length of the flat side of the cross section of the elastic loop, such that:

when the elastic loop is passed through the tightening ring, the flat sides of two cross sections of the elastic loop face each other and the curved sides of the two cross sections face the inner surface of the tightening ring to secure the tightening ring to the elastic loop; and when the fastener is attached to the sidepiece, the flat side of the cross section of the elastic loop faces the sidepiece to secure the elastic loop to the sidepiece.

2. The fastener of claim 1, wherein the cross section of the elastic loop has a flat side and a semi-circular side.

3. The fastener of claim 1, wherein the cross section of the elastic loop has a flat side and a conical side.

4. The fastener of claim 1, wherein the elastic loop is made of neoprene.

5. The fastener of claim 1, wherein the elastic loop has a rough surface on its external edge.

6. The fastener of claim 5, wherein the elastic loop has grooves on its external edge.

* * * * *